Figure 1:
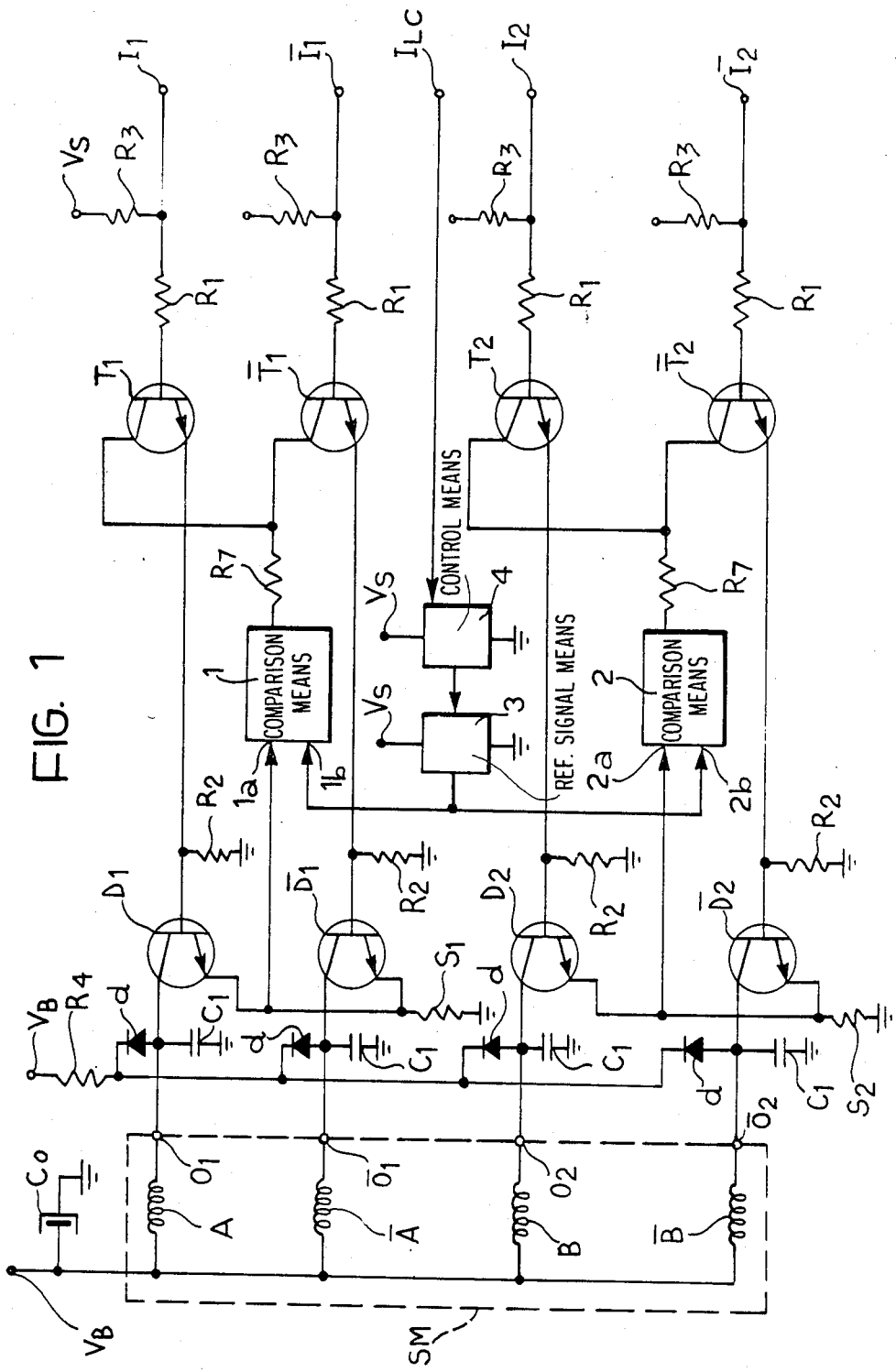

United States Patent [19]

Schiavon

[11] Patent Number: 4,740,737
[45] Date of Patent: Apr. 26, 1988

[54] CONSTANT-CURRENT CONTROL CIRCUIT FOR A STEPPED MOTOR OF SINGLE-POLE TYPE, PARTICULARLY FOR USE IN MOTOR VEHICLES

[75] Inventor: Mauro Schiavon, Cumiana, Italy
[73] Assignee: Marelli Autonica S.p.A., Pavia, Italy
[21] Appl. No.: 884,332
[22] Filed: Jul. 11, 1986
[30] Foreign Application Priority Data
Jul. 12, 1985 [IT] Italy ................ 67644 A/85
[51] Int. Cl.$^4$ ............................................. H02P 8/00
[52] U.S. Cl. ..................................... 318/696; 318/685
[58] Field of Search ............. 318/696, 685; 123/440, 123/438, 489

[56] References Cited

U.S. PATENT DOCUMENTS

| | | | |
|---|---|---|---|
| 4,036,186 | 7/1977 | Hattori et al. | 123/438 X |
| 4,285,319 | 8/1981 | Hattori et al. | 123/489 X |
| 4,336,484 | 6/1982 | Marinko | 318/696 |
| 4,347,821 | 7/1982 | Saito | 123/440 X |
| 4,439,717 | 3/1984 | Binney | 318/696 |
| 4,453,194 | 6/1984 | Frankeny et al. | 318/685 X |
| 4,471,283 | 9/1984 | Presley | 318/696 |
| 4,506,207 | 3/1985 | Ferrari | 318/696 |

Primary Examiner—William M. Shoop, Jr.
Assistant Examiner—Saul M. Bergmann
Attorney, Agent, or Firm—Sughrue, Mion, Zinn, Macpeak, and Seas

[57] ABSTRACT

A constant-current control circuit for a stepped motor of unipolar excitation. First and second switch devices are connected to phase and complementary phase inputs of the motor, respectively, and are responsive to a control signal. A sensor is connected to the switch devices to provide a sensor signal indicative of the current flowing in the phase or complementary phase input, and a generator means is included to provide a constant reference signal. Regulating and comparison means is included to compare the sensor signal and the reference signal, and regulate the current conducted by the switch devices in response thereto.

11 Claims, 2 Drawing Sheets

CONSTANT-CURRENT CONTROL CIRCUIT FOR A STEPPED MOTOR OF SINGLE-POLE TYPE, PARTICULARLY FOR USE IN MOTOR VEHICLES

DESCRIPTION

The present invention relates to control circuits for stepped motors of unipolar excitation, having the common terminal for its phases connected, in use, to a d.c. voltage supply or supply battery, particularly for use in motor vehicles.

The invention relates more specifically to a circuit of the type which, for each pair of complementary phases of the stepped motor, includes:
- first and second inputs for complementary logic control signals, and
- first and second controlled-conduction switch divices respectively connected to one phase and the complementary phase and arranged, in dependence on the control signals given at their inputs, to assume first and second conditions in which each allows or prevents the passage of current in the respective connected phase.

The subject of the invention is a control circuit of the type specified above, characterised in that, for each pair of phases of the motor, it includes
- a sensor connected to the first and second switch devices for providing a signal indicative of the current flowing in the phase energised at the time,
- generator means for providing a constant reference signal, and
- regulating and comparison means connected to the generator means and to the sensor, and arranged to modify the current conducted by the switch device energised at the time, so as to minimise the difference between the signal output by the sensor and the reference signal.

According to a further characteristic, the circuit also includes control means for causing a reduction in the current circulating in the two phases energised when the motor is stopped.

These control means include:
- a further input for a logic-type activation signal, and
- a control circuit connected to the further input and to the generator means and arranged, when activated, to modify the reference signal so as to cause, through the regulating and comparison means, a reduction in the current circulating in the switch devices associated with the phases which are energised when the motor is stopped.

Figure 2:
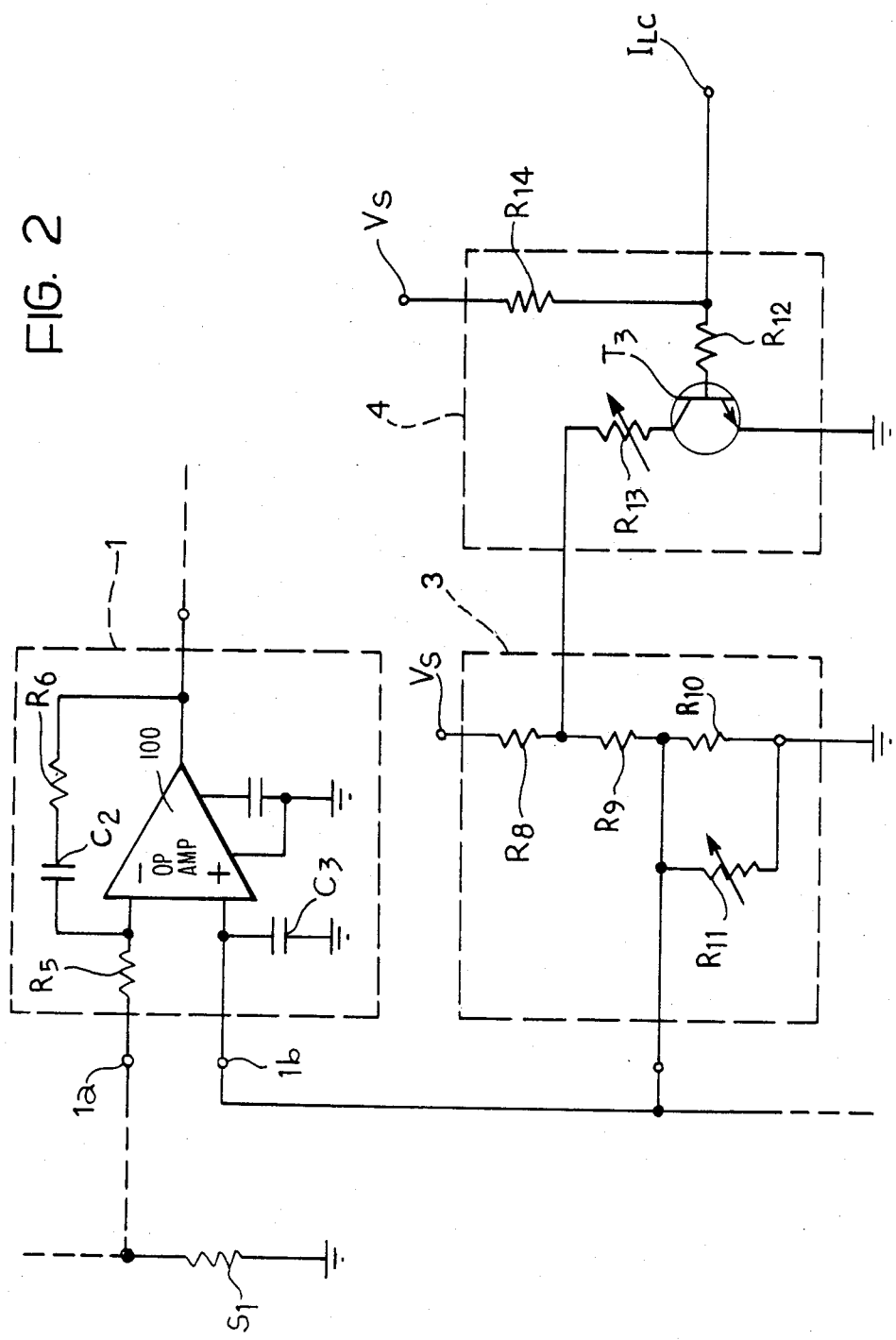

Further characteristics and advantages of the control circuit according to the invention will become apparent from the detailed description which follows with reference to the appended drawings, provided purely by way of non-limiting example, in which:

FIG. 1 is a partially blocked circuit diagram of a control circuit according to the invention, and FIG. 2 is a detailed circuit diagram of part of the control circuit of FIG. 1.

With reference to FIG. 1, a stepped motor of single pole type, having two pairs of phases A,$\overline{A}$ and B,$\overline{B}$ and a common terminal connected to a dc supply source $V_B$, is generally indicated SM.

The motor SM may be used, for example, to control the position of the throttle valve in the carburetor of the engine of a motor vehicle and, in this application, the voltage $V_B$ would be the voltage supplied by the battery of the motor vehicle.

A high-capacity capacitor $C_O$ is connected between the voltage source $V_B$ and ground in order to limit radiation interference.

The output terminals $O_1$, $\overline{O}_1$, $O_2$, $\overline{O}_2$ of a control circuit according to the invention are connected in order to the phases of the motor SM. This circuit has two pairs of complementary input terminals $I_1$, $\overline{I}_1$, $I_2$, $\overline{I}_2$ for receiving control signals of complementary logic type so that, for example, when the input terminal $I_1$ receives a low level signal, the input terminal $\overline{I}_1$ receives a high-level signal.

The control circuit has a further input terminal, indicated $I_{LC}$, also intended to receive a logic-type control signal the functions of which will be explained below.

The input terminals of the control circuit are intended for connection to an electronic control and operating unit, for example a microprocessor.

Leaving the input terminal $I_{LC}$ to one side of the moment, the control circuit has four circuit branches with the same structure between the input terminals $I_1,\overline{I}_1$, $I_2,\overline{I}_2$ and the output terminals $O_1,\overline{O}_1$, $O_2,\overline{O}_2$. This structure will be described solely for the branch between the input terminal $I_1$ and the output terminal $O_1$.

The input $I_1$ is connected to the base terminal of a NPN type transistor $T_1$ whose emitter terminal is connected to the base terminal of a power transistor $D_1$, for example a power transistor of the Darlington type. Between the base terminal of the latter transistor and ground is a resistor $R_2$. The collector terminal of $D_1$ is connected to the phase A of the stepped motor and is also connected to the anode of a flyback diode d. A capacitor $C_1$ is connected between the collector terminal of $D_1$ and ground.

A resistor $R_3$ is connected between the input terminal $I_1$ and a dc voltage supply $V_S$.

One is referred to FIG. 1 for the references adopted for the components of the circuit branches connecting the other three inputs to the outer three outputs of the control circuit.

The cathodes of the flyback diodes d are connected to the voltage source $V_B$ through a flyback resistor $R_4$. The emitter terminals of $D_1,\overline{D}_1$ and $D_2$, $\overline{D}_2$ respectively are connected together and connected to ground through respective shunt resistors $S_1$ and $S_2$, respectively. These resistors are preferably of the metal-layer type and have very small resistances.

The terminals of $S_1$ and $S_2$ which are not connected to ground are connected to a first input terminal 1a, 2a of two regulating circuits, indicated as 1 and 2. To a second input terminal 1b, 2b of these circuits is connected the output of a circuit 3 for generating a constant voltage reference signal. This circuit is connected to the output of a control circuit 4, the input of which is connected to the input terminal, $I_{LC}$.

The circuits 1 and 2 have the same internal structure, for example that shown in FIG. 2 with reference to the circuit 1. This latter includes an integrated operational amplifier 100, for example, and LM 2904 circuit. Operational amplifier 100 has its inverting input terminal connected to the resistor $S_1$ through a resistor $R_5$. Between the inverting input terminal and the output terminal are a capacitor $C_2$ and a resistor $R_6$ connected in series. A capacitor $C_3$ is connected between the non-inverting input terminal and ground.

The circuits 1 and 2 have their respective output terminals connected to the collectors of $T_1, \overline{T}_1$ and $T_2, \overline{T}_2$ respectively through resistors $R_7$.

The circuit 3, as shown in FIG. 2, includes a resistive divider between the voltage source $V_S$ and ground, this divider including three resistors $R_8$, $R_9$ and $R_{10}$ in series with each other. In parallel with $R_{10}$ is a further resistor $R_{11}$, preferably of an adjustable type. This represents the output of the circuit 3.

The control circuit 4 includes a transistor $T_3$ of NPN type having its base terminal connected to the input terminal $I_{LC}$ through a resistor $R_{12}$, its emitter terminal connected to ground, and its collector terminal connected to the terminal common to $R_8$ and $R_9$ through a resistor $R_{13}$ preferably of an adjustable type. A resistor connected between terminal $I_{LC}$ and the voltage source $V_s$ is indicated as $R_{14}$.

The control circuit described above functions as follows.

It is assumed that the logical levels received by terminals $I_1$ and $I_2$ are at level 1 and the logical levels received by terminals $\overline{I}_1$ and $\overline{I}_2$ at level 0. In this condition $T_1$ and $T_2$ and hence $D_1$ and $D_2$ conduct current, and the phases A and B are live. In this situation, the motor is stopped. If terminal $I_{LC}$ is also at level 1, then $T_3$ is conductive and the voltage which the circuit 3 presents to the non-inverting input terminal of IC the operational amplifier 100 is small, so that the voltage output by differential amplifier IC the operational amplifier 100 is also small to $T_1, T_2$ and $D_1, D_2$ are thus kept moderately conductive. Thus, a small current circulates in the live phases A and B of the motor and results in the double advantage of limiting the power dissipated in the motor and the absorption of charging current from the voltage source $V_B$.

When it becomes necessary to operate the motor, the input terminal $I_{LC}$ must be brought to the level 0, disabling $T_3$. Consequently, the reference voltage presented by the circuit 3 to the non-inverting input terminal of IC the operational amplifier 100 is raised and there is a corresponding increase in the voltage output by the latter. Consquently, the current circulating in $T_1$ and $T_2$ increases. The capacitor $C_3$ enables the switching between low-current running and high-current running to be made gradually in the live phases of the motor. If the logical levels received by input terminals $I_1$ and $\overline{I}_1$ then change simultaneously to level 0 and to level 1 respectively, $T_1$ and $D_1$ are disabled and $\overline{T}_1$ and $\overline{D}_1$ become conductive: consequently, the current no longer passes through the phase A but the phase $\overline{A}$ is made live.

According to the signals applied to the complementary input terminals $I_1, \overline{I}_1$ and $I_2, \overline{I}_2$, the control circuit and thus the stepped motor SM operate in a manner similar to that described above.

In each operating phase, the voltage drop across $S_1$ and $S_2$ is indicative of the current circulating in one of the two phases of the motor with which each of these resistors is respectively associated. For example, if this current tends to fall as a result of a fall in the charge in the battery $V_B$, the voltage presented at the inverting input terminal of $I_C$ the operational amplifier 100 falls and there is a corresponding increase in the voltage supplied to the transistors T or $\overline{T}$ conductive at that moment, this voltage rendering them conductive and thus causing an increase in the current flowing in the live phases. This increase compensates for the reduction in the current due to discharge of the battery $V_B$.

The control circuit thus allows the motor to operate at constant current. The constant current control allows the step frequency, that is the inversion time of the current in a pair of windings or phases, to be optimised. It may in fact happen that, if this current is constant, one has the maximum rapidity of switching.

The circuit described above allows the energization of the phases of the motor in the three classic modes known in English terminology as "full step", "half step", and "one phase on".

The use of current sensors constituted by shunt resistors of the metal-layer type is particularly convenient. In fact, these resistors are very cheap and allow good stability of the performances of the circuit on variations in temperature to be achieved.

In the regulating circuit 1, the capacitor $C_2$ in the feedback network between the inverting input terminal and the output terminal of the operational amplifier 100 allows any oscillations to be damped.

The circuit 4 for controlling the reduction in current is activated by a logical 1 level at the input terminal $I_{LC}$ every time the motor SM must remained stopped. In addition to the advantages already noted, the reduction in the current allows any undesired movements of the motor to be avoided safely and allows the power dissipated in the power transistors D and $\overline{D}$ to be reduced.

The resistor $R_4$ allows the recycling of current when, on switching, the power transistors switch from on to off. The capacitors $C_1$, in addition to protecting the circuit from electromagnetic interference, allow the peak voltage in the final transistors to be limited in the first instance of switching between on and off when the flyback diodes d have not yet become conductive. These capacitors thus enable the use of slow-type flyback diodes which are particularly cheap.

Naturally, the principle of the invention remaining the same, the forms embodiment and details of realisation may be varied widely with respect to that described and illustrated purely by way of non-limiting example, without thereby departing from the scope of the present invention.

I claim:

1. A control circuit for a stepped motor of unipolar excitation, particularly for use in motor vehicles; the motor having a plurality of pairs of complementary phases with a common terminal connected to a d.c. voltage source; said circuit comprising for each pair of complementary phases of the motor:

first and second input terminals for receiving complementary logic control signals;

first and second controlled-conduction switch devices respectively connected to one phase and the complementary phase, said controlled-conduction switch devices being selectable to one of a first and second state using said first and second input terminals, said first state allowing the passage of current to energize said respective connected phase, and said second state preventing the passage of current in said respective connected phase;

a sensor connected to said first and second controlled-conduction switch devices for providing a sensor signal indicative of the current flowing in a phase energized at the time;

reference signal means for providing a reference signal; and comparison means connected to receive the reference signal and the sensor signal from said reference signal means and said sensor respectively, said comparison means providing a signal, whereby the current conducted by the switch device in said first state is controlled in response to a comparison of the sensor signal output by the sensor and the reference signal; and control means for causing said controlled-conduction switch devices selected in a first state to allow the passage of current of a first level when said stepped motor is running, and to allow the passage of current of a second level at the time said motor is stopped.

2. A control circuit according to claim 1, wherein the reference signal provided by said reference signal means is output to the comparison means associated with each said pair of complementary phases of said motor.

3. A control circuit according to claim 1, wherein each of the sensors comprises a metal-layer resistor.

4. A control circuit for a stepped motor of unipolar excitation, particularly for use in motor vehicles; the motor having a plurality of pairs of complementary phases with a common terminal connected to a d.c. voltage source; said circuit comprising for each pair of complementary phases of the motor:

first and second input terminals for receiving complementary logic control signals;

first and second controlled-conduction switch devices respectively connected to one phase and the complementary phase, said controlled-conduction switch devices being selectable to one of a first and second state using said first and second input terminals, said first state allowing the passage of current to energize said respective connected phase, and said second state preventing the passage of current in said respective connected phase;

a sensor connected to said first and second controlled-conduction switch devices for providing a sensor signal indicative of the current flowing in a phase energized at the time;

reference signal means for providing a reference signal; and comparison means connected to receive the reference signal and the sensor signal from said reference signal means and said sensor respectively, said comparison means providing a signal, whereby the current conducted by the switch device in said first state is controlled in response to a comparision of the sensor signal output by the sensor and the reference signal;

wherein said first controlled-conduction switch device is a first power transistor having its collector connected to the corresponding phase, said second controlled-conduction switch device is a second power transistor having its collector connected to the corresponding complementary phase, the emitter of said first power transistor being connected to the emitter of said second power transistor associated with the complementary phase; the collector of each said first and second power transistors being connected to respective flyback diodes, the flyback diodes connected to said first and second power transistors being connected to the d.c. voltage source through a single resistor.

5. A circuit according to claim 4, wherein a respective capacitor is connected between each of said first and second power transistors and ground.

6. A circuit according to claim 1, wherein for each pair of complementary phases, said comparison means includes an operational amplifier having a first input terminal connected to said sensor and a second input terminal connected to said reference signal means.

7. A circuit according to claim 6, wherein said reference signal means comprises a resistive voltage divider connected between said D.C. voltage supply and ground.

8. A circuit according to claim 6, wherein said operational amplifier has a feedback network including a capacitor connected between said first input terminal and an output terminal.

9. A control circuit for a stepped motor of unipolar excitation, particularly for use in motor vehicles; the motor having a plurality of pairs of complementary phases with a common terminal connected to a d.c. voltage source; said circuit comprising for each pair of complementary phases of the motor:

first and second input terminals for receiving complementary logic control signals;

first and second controlled-conduction switch devices respectively connected to one phase and the complementary phase, said controlled-conduction switch devices being selectable to one of a first and second state using said first and second input terminals, said first state allowing the passage of current to energize said respective connected phase, and said second state preventing the passage of current in said respective connected phase;

a sensor connected to said first and second controlled-conduction switch devices for providing a sensor signal indicative of the current flowing in a phase energized at the time;

reference signal means for providing a reference signal; and comparison means connected to receive the reference signal and the sensor signal from said reference signal means and said sensor respectively, said comparison means providing a signal, whereby the current conducted by the switch device in said first state is controlled in response to a comparison of the sensor signal output by the sensor and the reference signal; and control means whereby said reference signal provided by said reference signal means can be selected to one of first and second reference levels, said control means comprising:

a further input terminal for receiving a logic-type activation signal; and conduction control means connected to said further input terminal and to said reference signal means, said conduction control means being responsive to said logic-type activation signal to select one of said first and second reference levels so as to cause, through said comparison means, said controlled-conduction switch devices selected in a first state to allow the passage of current of a first level when said reference signal is selected to said first reference level, and to allow the passage of current at a second lower level when said reference signal is selected to said second reference level.

10. A control circuit according to claim 9, including means for allowing the independent adjustment of said first and second reference levels assumed by said reference signal.

11. A control circuit according to claim 9, wherein the conduction control means comprises:

a resistive voltage divider network connected to said reference signal means; and a transistor having a base terminal connected to said further input terminal, and a collector terminal connected to said resistive divider network.

* * * * *